United States Patent [19]

Legrand et al.

[11] 4,188,666
[45] Feb. 12, 1980

[54] METHOD AND INTEGRATED SYSTEM FOR THE TORQUE CONTROL AND ENERGY STORAGE FOR A SPACE VEHICLE

[75] Inventors: Francis Legrand, Rocquencourt; Bernard Weisser, Verneuil sur Seine, both of France

[73] Assignee: Societe Nationale Industrielle et Aerospatiale, Paris, France

[21] Appl. No.: 908,598

[22] Filed: May 22, 1978

[30] Foreign Application Priority Data

May 31, 1977 [FR] France .................. 77 16616

[51] Int. Cl.² .................. G06F 15/50; B64G 1/10
[52] U.S. Cl. .................. 364/434; 244/164; 244/173
[58] Field of Search .............. 364/434, 453, 454, 459; 244/164, 165, 168, 171, 173

[56] References Cited

U.S. PATENT DOCUMENTS

| | | | |
|---|---|---|---|
| 3,591,108 | 7/1971 | Perkel et al. | 244/165 |
| 3,740,636 | 6/1973 | Hogrefe et al. | 244/173 X |
| 3,758,051 | 9/1973 | Williams | 244/173 X |
| 4,084,773 | 4/1978 | Schmidt, Jr. et al. | 364/434 X |

*Primary Examiner*—Jerry Smith
*Attorney, Agent, or Firm*—Karl W. Flocks

[57] ABSTRACT

The energy storage is effected kinetically. The system includes a first feedback loop with a time constant $\tau1$ including a regulator connecting the supply busbar to a device for controlling momentum wheels used for the kinetic energy storage and the torque control. A second feedback loop, of time constant $\tau2$, transmits velocity data $\omega$ from the momentum wheels to a processing unit, constituted by a microprocessor, which controls the wheel actuating device. A third feedback loop, of time constant $\tau3$, supplies the processing unit with the data regarding the torque required by the satellite piloting device.

12 Claims, 9 Drawing Figures

METHOD AND INTEGRATED SYSTEM FOR THE TORQUE CONTROL AND ENERGY STORAGE FOR A SPACE VEHICLE

BACKGROUND OF THE INVENTION

1. Field of the Invention

The present invention relates to a method and an integrated system for torque control and energy storage enabling the realization at the same time of the storage of energy, the regulation of the on board supply voltage and the control of the torques applied in a space vehicle.

2. Description of the Prior Art

In conventional systems of the prior art, there have been used chemical energy storage and attitude control, these two functions being independant. Attitude control includes three principal elements, namely sensors, an electronic attitude control circuit and torque generators. The complexity of these elements is essentially a function of the type of mission to be carried out by the space vehicle. The sensors are constituted by a combination of solar sensors, ground sensors, star sensors and an inertial or gyroscope reference system. The electronic circuit can be either of the wired type or of the programmed type with the use of a microprocessor. In these conventional systems, the torque generators are generally effected by means of kinetic moment exchanges, that is to say by means of momentum wheels or reaction wheels, or by means of gas ejection. In such systems, the regulation of the line voltage produced by a solar generator is totally independent of the attitude control. Any modification of the load being manifested by a variation in the busbar voltage, it is then necessary to provide a shunt regulator which maintains the load resistance constant. This regulator operates practically permanently and absorbs the surplus power which is dissipated in the form of heat. This dissipation must take place towards the exterior of the vehicle on account of the problems of thermal control, which necessitates relatively complex devices. To be able to provide momentarily for energy requirements higher than the possibilities of the solar generator, there is used a battery controlled by a charge generator and a discharge regulator.

Subsequently, it appeared possible and desirable to replace the chemical storage of energy (fuel cells, Ag—Zn or NiCd or NiH$_2$ batteries) by kinetic energy storage using inertia wheels constituted by dynamo-electric machines with an inertial flywheel operable both as a motor and as a generator. Such a storage device is, for example, described in Applicant's French patent application No. 76.10158 filed 7 Apr. 1976. Kinetic storage is more advantageous than chemical storage notably on account of its performance with respect to the mass energy utilisable and the life span. However, kinetic storage produces an effect reacting directly on the attitude vehicle since the electrical energy-kinetic energy transfer is accompanied by a torque which, on account of the reaction principle, is applied to the structure of the vehicle. It is hence possible, if one uses kinetic energy storage, to couple the energy storage and the attitude control.

On this basis, NASA has already proposed a system, called IPACS ("Integrated Power/Attitude Control System"), effecting at the same time the storage of energy and the piloting of a space vehicle. In this system, the storage system can deliver important torques necessary for piloting or minimize the torques during operations of energy transfer. This is achieved either by wheels mounted on a single or double gimbal joint, or by the use of several assemblies of counter-rotating wheels and the final piloting of the vehicle is produced by reaction wheels. In this system, all the functions are interdependent which requires a review of the optimal configuration for each mission. Thus the arrangement and the design of the wheels differ for each case contemplated.

It is an object of the present invention to utilize to the maximum the advantages of kinetic energy storage without having the restrictions of the IPACS which encompasses both the functions of energy storage and of attitude control of the whole of the space vehicle.

It is a further object of the present invention to provide an integrated system for torque control and energy storage which produces the energy storage and delivers the torques required by the attitude control, but in which the attitude control in itself is independent of the system.

GENERAL DESCRIPTION OF THE INVENTION

The storage of energy according to the invention consists of effecting the operations of storage and of restitution of the energy, and of regulation of the on board supply voltage. Disturbing torques are kept at a very low level during these operations, but the machines, or inertial wheels, are also useable as torque generators.

According to the present invention, the line voltage available at the power supply busbar of the satellite is provided by a solar generator and by a kinetic energy storage device constituted by two momentum wheels mounted in counter-rotation, said wheels serving also to create the torques necessary for the piloting of the satellite. The method according to the invention is characterized in that the control of the inertial wheels is servo-coupled by a first feedback loop to the busbar voltage so as to regulate it, through a second feedback loop to the speed of the inertial wheels so as to keep at a very low level the disturbing torques produced by the kinetic energy storage, and through a third feedback loop to the piloting device of the satellite so as to provide the necessary torques for piloting. In order that these three feedback loops may be entirely uncoupled, the method according to the invention provides very different time constants, the time constant of the first loop being very much less than that of the second, itself very much less than that of the third loop.

BRIEF DESCRIPTION OF THE DRAWINGS

The invention will now be described in more detail with reference to the accompanying drawings by way of examples which are in no way limiting and in which.

DESCRIPTION OF PREFERRED EMBODIMENTS

Figure 1:
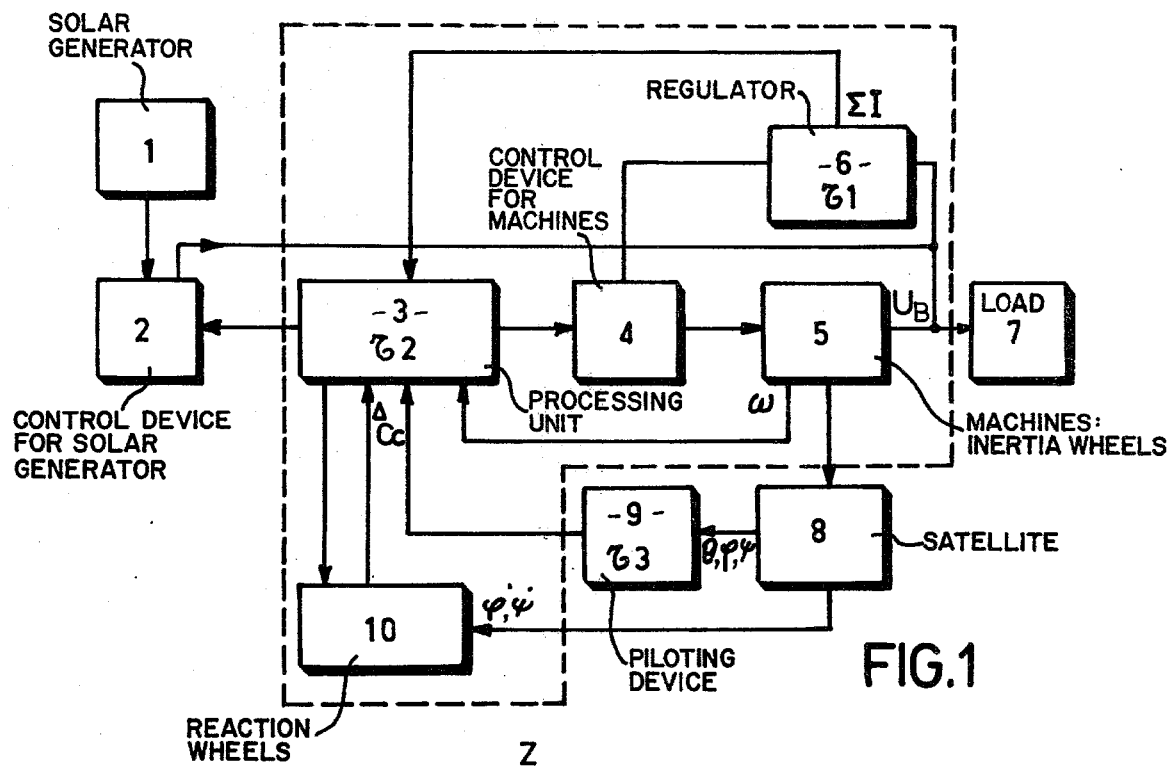
FIG. 1 shows, in synoptic form, an embodiment of the system according to the invention.

In FIG. 1, are shown the various components of an embodiment of the integrated system for torque control and energy storage according to the invention, as well as the connections existing between these various components and the parameters utilized for the control of the system.

Certain elements are, in fact, external to the system and are shown on the outside of a dashed line which surrounds the components of the system. These external elements are of conventional type and consequently will not be described. This concerns notably the satellite 8 which supplies to the piloting device 9 the parameters $\theta$, $\phi$ and $\psi$ corresponding to its position, the solar generator 1 connected to the control device for the solar generator 2, the load 7 corresponding to the elements utilizing the line voltage $U_B$ supplied by the system, and the piloting device 9 providing a torque control $\Delta C_c$ to the processing unit 3.

The system shown in FIG. 1 is essentially constituted by three feedback loops.

The first feedback loop has a time constant $\tau 1$ in the neighborhood of 20 $\mu$s and it is designed to maintain the busbar voltage $U_B$ constant. In this first feedback loop, the busbar voltage $U_B$ is used to control a regulator 6, itself coupled to the control device 4 of the machines 5.

A second feedback loop has a time constant $\tau 2$ in the neighborhood of 0.1 s and it is designed to ensure the constancy of the kinetic moment so as to maintain at a very low level the disturbing torques produced by the kinetic energy storage. This loop transmits speed data $\omega$ from the energy storage wheels 5 to the processing unit 3 which acts on the machine control device 4.

A third feedback loop has a time constant $\tau 3$ in the neighborhood of 10 s and it is designed for the piloting of the satellite. For this third loop, the processing unit 3 receives from the piloting device 9 the torque correction data $\Delta C_c$ and the system then acts simply as a torque generator. The processing unit 3 then acts on the machine control device 4 which controls the inertia wheels 5 to create the necessary torques which are applied to the satellite 8.

The large separation between the various time constants ensures correct uncoupling of the three feedbacks. The piloting of the satellite is not affected by the introduction of the kinetic energy storage and the piloting device 9 can hence be of conventional type.

One of the important aspects of the invention relates hence to the torque control. This control includes within itself two aspects, namely the minimum production of disturbing torques and the control of the torques for piloting.

Figure 2:
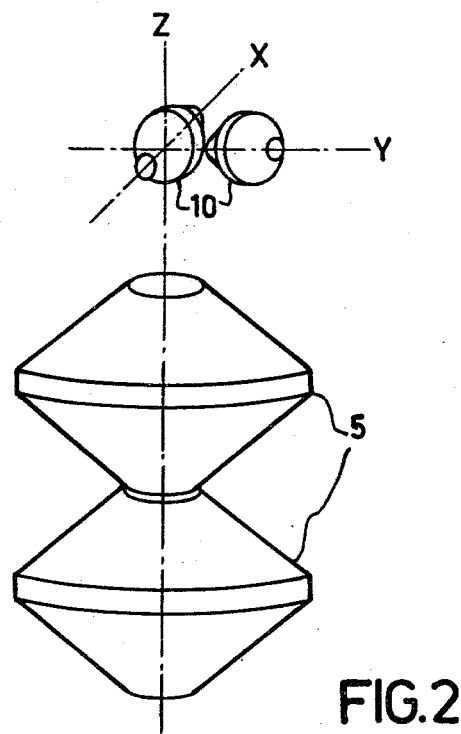
FIG. 2 shows the arrangement of the reaction wheels and of the energy storage wheels.

To ensure the minimum disturbing torques, it suffices in principle to provide the machines in counter-rotation. However, if this arrangement is effective when the kinetic moments are colinear, this is not sufficient for machines using magnetic bearings of the "one axis" type for in this case the kinetic moments are not colinear. In fact, these machines include permanent magnets producing the suspension in a passive form along two axes X, Y and an active servo-system along the third axis Z. The position of the axis of the rotor of the machine with respect to the geometric axis results from the balancing of the forces, so that it is not possible to determine exactly what is the orientation of the kinetic moment vector. The deformations of the rotor with speed produce moreover a modification in the orientation of the kinetic moment vector. It is possible to compensate for the deviations in kinetic moments of the energy storage wheels by the use of reaction wheels 10 controlled by the processing unit 3. These reaction wheels are arranged at 90° along axes perpendicular to the energy storage wheels as shown in FIG. 2. This system enables the delivery along the three axes of the torques necessary for piloting. The reaction wheels 10 are preferably wheels such as described in Applicant's French patent application No. 77 07685 filed 15 Mar. 1977 corresponding to U.S. patent application Ser. No. 886,496, filed on Mar. 14, 1978.

As regards the control of torques for piloting, the piloting device 9 provides the processing unit 3 with the value of the torques to be applied. The latter constitute the reference values applied to the servo-systems producing the constancy of the kinetic moment along the three axes.

According to the invention, the machine control device 4 must enable the e.m.f. to be kept constant and the line voltage available to be used directly. Now the electromotive force E of a machine is proportional to the flux and to the speed according to the classical formula $E = k\omega$, k being a constant dependent on the flux and $\omega$ the angular speed of the rotor of the machine. It appears that a variable speed produces a variable e.m.f. if k is constant. Now the variation in speed is necessary on account of the requirements of variations in the stored energy.

According to the invention, to vary $\omega$, k is made to vary by applying a particular order to the machine. This permits the e.m.f. to be kept constant. Thus, as described in Applicant's French patent application No. 76 11087 filed 14 Apr. 1976, corresponding to U.S. patent application Ser. No. 787,653, filed on Apr. 4, 1977, this result can be obtained by the use of a control device enabling the mean e.m.f. of a machine to be adapted to the voltage $U_B$ as a function of the speed, by defining the commutation windows of the windings of the machines corresponding to an advance shift of the control when the machine operates as a motor and to a retard shift when it operates as a generator.

The operation of the control of the machines as a function of the torques necessary for piloting and of the voltage $U_B$ will be explained later with respect to FIG. 9.

The energy storage is more particularly illustrated in FIGS. 3 to 6.

Figure 3:
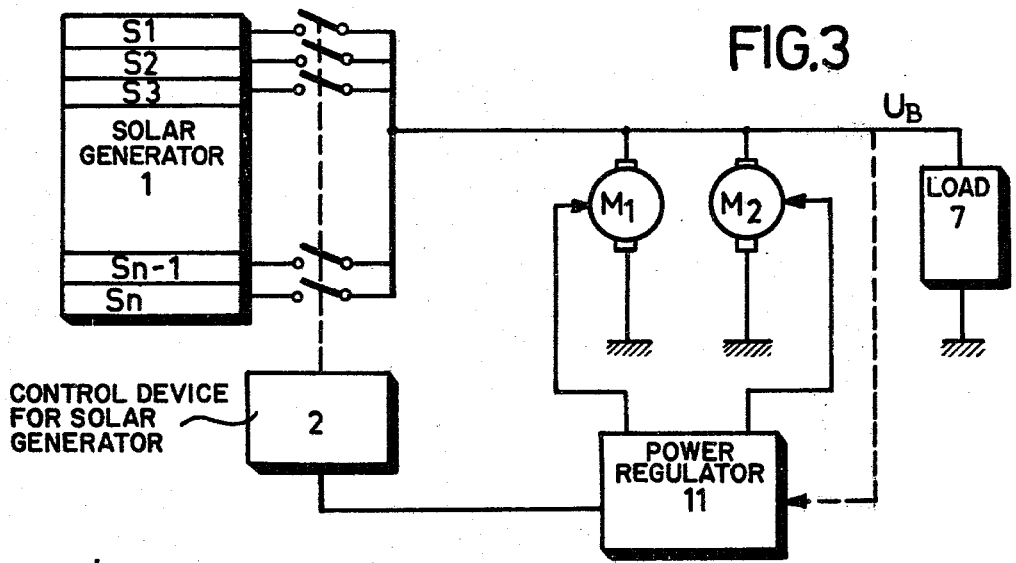
FIG. 3 shows diagrammatically the power storage.

In FIG. 3, the solar generator 1, including n sections S1 to Sn is shown diagrammatically. The number of sections of the solar generator used, that is to say the useful surface, is commanded by the control device of the solar generator 2. This enables coarse adjustment of the power demanded by the load 7 to the power supplied. The machines M1 and M2 are mounted in parallel at the supply terminal so as to enable the fine adjustment of the line voltage $U_B$.

Any variation in power necessary for the load is absorbed first by the machines then taken up by the solar generator. The power regulator 11 acts on the control device of the solar generator 2 and controls the machines M1 and M2 according to the voltage $U_B$. In the diagram of FIG. 1, it is the processing unit 3 connected to the machine control device 4 which ensures this power regulation function.

Figure 4:
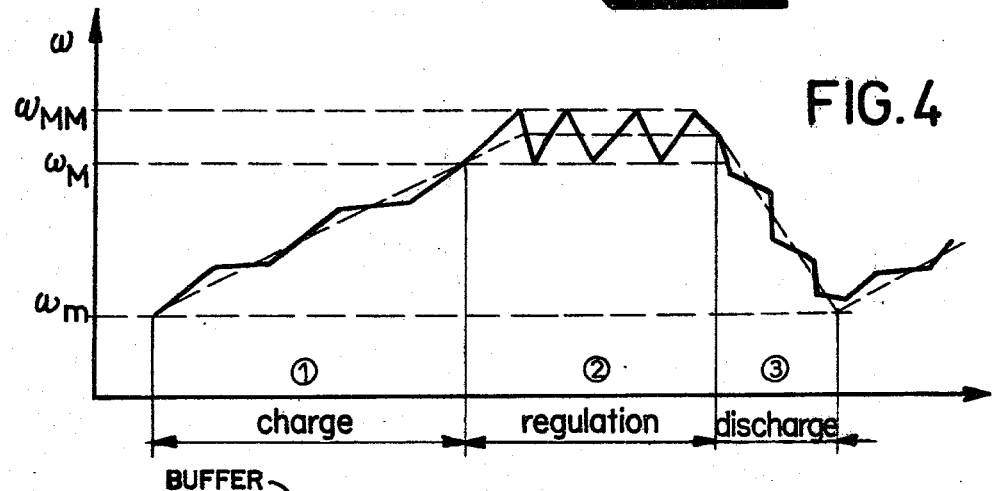
FIG. 4 illustrates the various states of operation of the machines.

FIG. 4 illustrates the various states of operation of a machine, characterized by the average development in the speed ω of the machine.

During charging ①, or energy storage, there is an increase in the mean speed.

The regulation ② corresponds to stagnation of the mean speed.

Discharge ③ corresponds to a decrease in the mean speed.

This regulation of the busbar voltage $U_B$ by adjustment of the control of the machines through the processing unit 3 has a relatively long response time, corresponding to the response time $\tau 2$, in the neighborhood of 0.1 s, of the processing unit. Hence it is necessary to provide more rapid regulation whose action will be transitory, so as to enable the processing unit to react.

Thus, on the mean variation of the speed shown in FIG. 4 is superimposed a more rapid variation conditioned by the regulation in the on board supply voltage and by the operational limits of the machine.

These limits are notably the maximum current passing through a machine, the charging speed, the minimum speed $\omega_m$ ensuring regulation, the maximum speed $\omega_M$ enabling regulation during the period of occulting and the maximum speed $\omega_{MM}$ tolerated by the machine.

Figure 5:
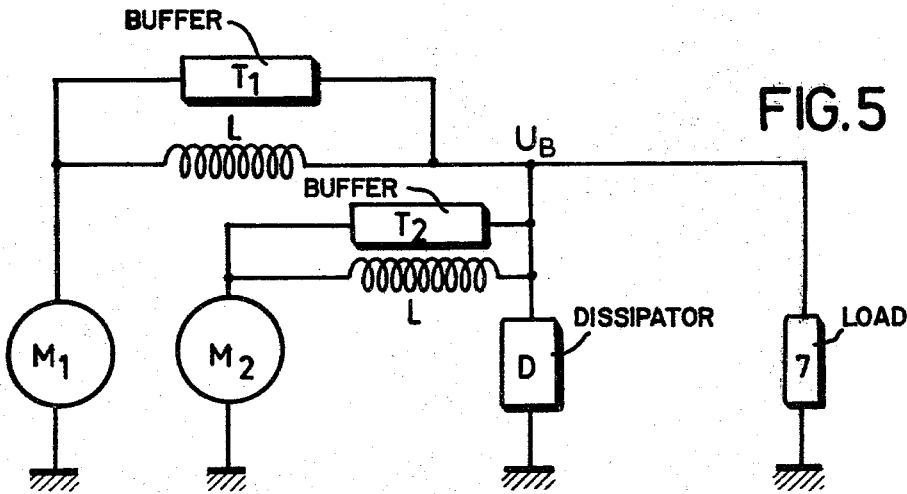
FIG. 5 shows the voltage regulation.

FIG. 5 shows in very diagrammatic manner the voltage regulation which reacts rapidly to any variation in the busbar voltage $U_B$. In this figure there are simply shown two machines M1 and M2, mounted in counter-rotation, connected respectively to the supply terminal through a self induction L.

When the busbar voltage $U_B$ increases, this is due to the fact that the power supplied is greater than the power absorbed. A dissipator D mounted in parallel with the load 7 is then designed to absorb the energy surplus. When, on the other hand, the busbar voltage $U_B$ decreases, since the power supplied is less than that absorbed by the load, then buffers T1 and T2 short-circuit the self-inductances L.

The dissipator D and the buffers T1 and T2 only operate during some cycles of the processing unit 3 (at a maximum 0.5 s). The current flowing in the buffers and the dissipator ($\Sigma 1$ in FIG. 1) are measured and sent to the processing unit 3 which adjusts the control of the machines to the energy requirements.

Figure 6:
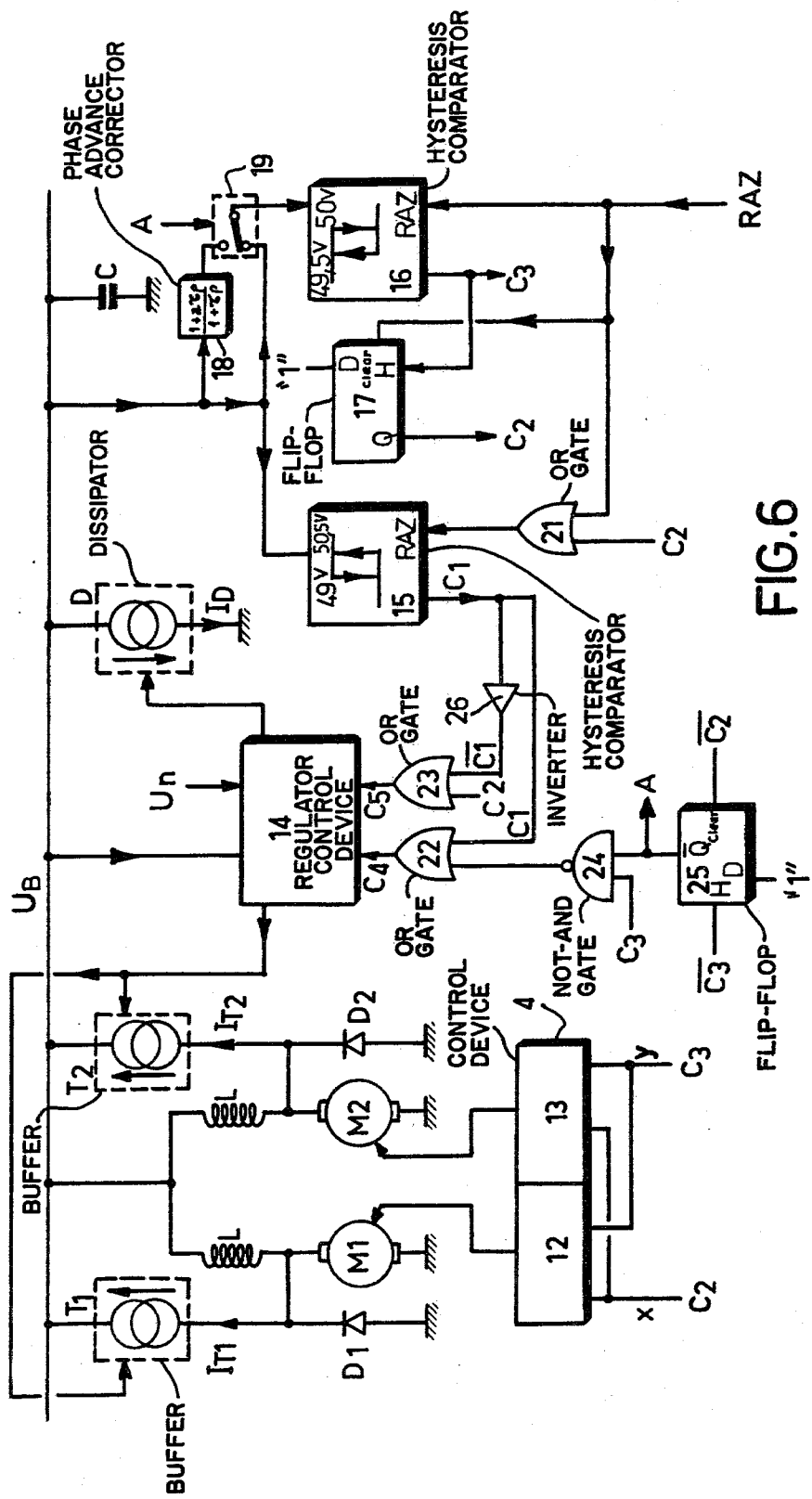
FIG. 6 shows an embodiment of a voltage regulator.

FIG. 6 shows the regulator 6 and its connections with the machines M1 and M2 as well as with the machine control device 4. In FIG. 6 this control device 4 is divided into two parts 12 and 13 designed respectively to control the machines M1 and M2. In FIG. 6 are again found the machines M1 and M2 connected through the self-inductances L to the supply busbar, the buffers T1 and T2 being respectively mounted in parallel to the self-inductances L. Dissipator D is connected between ground and the supply busbar. Two diodes D1 and D2 are respectively mounted in parallel to the machines M1 and M2. These diodes serve to recover the electromagnetic energy stored in the self-inductances on an all-or-nothing control of the machines in generating operation.

The regulator 6 includes in addition a regulator control device 14 controlling the placing in operation of the dissipator D and of the buffers T1 and T2 according to the value of $U_B$ with respect to the nominal value $U_n$ of the busbar voltage.

The control circuit of the control device 14 includes principally two hysteresis comparators 15 and 16 and a flip-flop 17 detecting the thresholds $U_n$, $U_n-1\% U_n$ and $U_n+1\% U_n$.

In a preferred embodiment, the voltage $U_n$ is 50 V. If the voltage $U_B$ exceeds $U_n+1\% U_n$, namely 50.5 V, the threshold detector 15 supplies a signal C1; this signal C1 is applied to the input of an inverter 26 which hence supplies a signal $\overline{C1}$ of logic value 0 when the voltage $U_n+1\% U_n$ is exceeded. This signal $\overline{C1}$ is applied to one of the inputs of an OR gate 23 whose output C5 inhibits the dissipator, through the control device 14, when it has a logic value 1. The other input of the OR gate receives a signal C2, whose significance will be given later, and which is zero in the case of overvoltage. The output C5 of the OR gate 23 is hence zero when $U_B$ is greater than $U_n+1\% U_n$ and the inhibition on the dissipator D is lifted. The latter, constituted by a controlled current generator of any known type, is then connected between the supply busbar and ground and delivers a current $I_D$ proportional to the error $U_B-U_n$. The dissipator current $I_D$ is measured and transmitted to the processing unit 3 which acts on the machine control device 4 so as to to reduce $U_B$, which reduces the current $I_D$ necessary. This process is repeated as often as necessary to practically annul the current $I_D$. When the ratio $I_D/I_{load}$ is sufficiently small, the processing unit 3 sends an RZ signal of 10 μs duration to the hysteresis comparator 15, through an OR gate 21. The output C1 from the comparator 15 is then brought back to zero so that the signal C5 takes the logic value 1 and inhibits the dissipator D.

Figure 7:
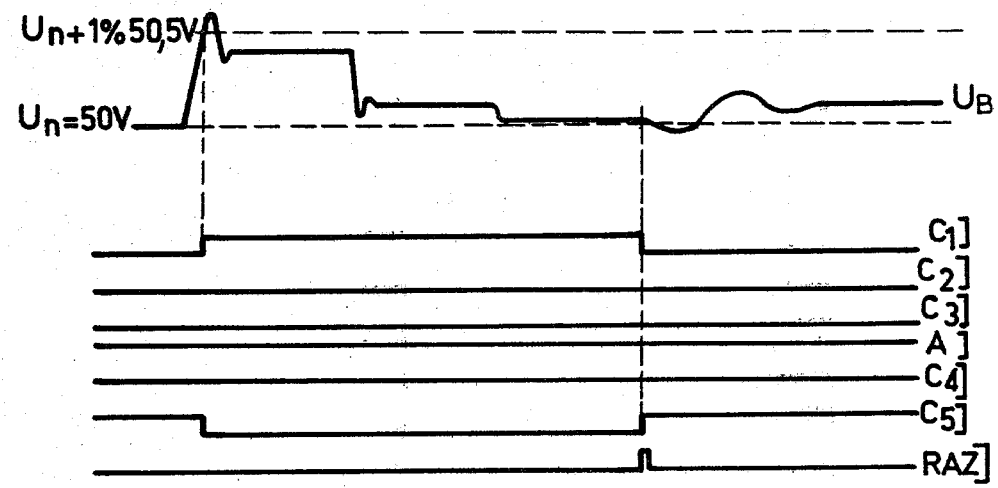
FIGS. 7 and 8 show respectively the logic signals and the busbar voltage $U_B$ in the case of over-voltage and of voltage drop.

Thus the dissipator D responds very rapidly to an overvoltage greater than a predetermined value, 50.5 V in the embodiment shown and only remains operational during the time necessary for the processing unit 3 to adjust the machine control device M1 and M2 to the requirements of the load 7. FIG. 7 illustrates the variations in the busbar voltage $U_B$ as well as the values of the logic signals in the case of overvoltage.

When the busbar voltage $U_B$ falls below $U_n-1\% U_n$ (49.5 V in the embodiment shown), the regulator is triggered so as to control the machines M1 and M2 to make them operate as generators at maximum power output. This should permit the voltage $U_B$ to rise again but this rise is limited by the self-inductances L, all the more as the wheels rotate more slowly. For example, for an e.m.f. $E_{max}=60$ V and $L=10$ mHm, one has di/dt self-inductance $=10^3$ A/s$=1$ A/ms. This is entirely incompatible with the desired regulation.

Consequently the buffers T1 and T2 are used, constituted by controlled current generators, which short-circuit the self-inductances L during the time necessary for the self-inductance current to reach the value ensuring a correct voltage $U_B$.

Figure 8:
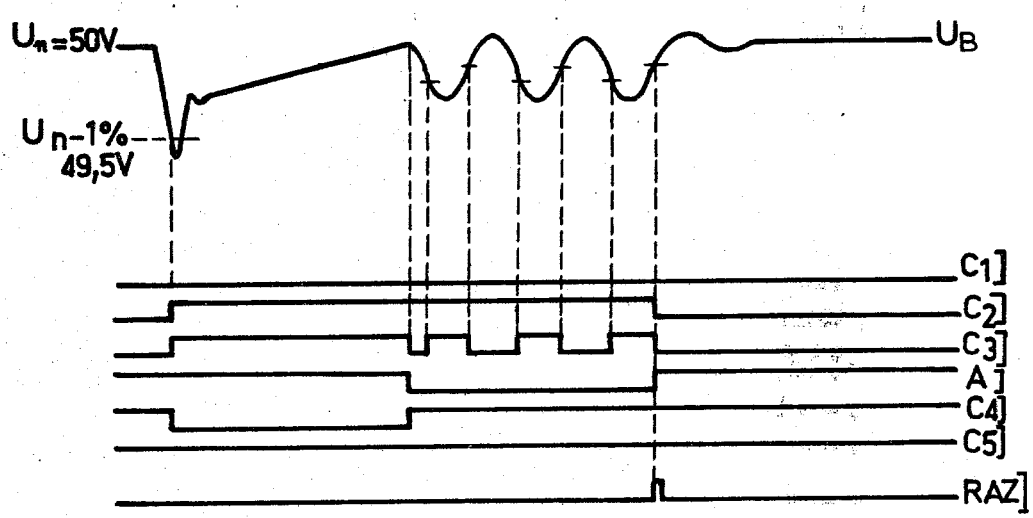

On a voltage drop the regulation proceeds in two phases as shown in FIG. 8.

First of all, when $U_B$ passes below $U_n-1\% U_n$, namely 49.5 V in the embodiment shown, the hysteresis comparator 16 supplies at the output, a signal C3 having a logic level 1. This signal C3 is applied to the clock input H of a first-flip-flop 17 whose input D is constantly at logic level 1. Thus the output Q of the flip-flop passes to 1 as soon as a signal of logic level 1 is applied to its input H and only returns to 0 when a signal of logic level 1 has been applied to its "clear" input which receives the RZ signal coming from the processing unit 3.

Thus, as soon as the voltage $U_B$ is less than 49.5 V the signal $C_2$ obtained at the output Q of the flip-flop 17 passes to logic level 1.

The signal $C_2$ is applied to the input x of the machine control device 4 which causes the latter to operate as generators. Simultaneously, the signal $C_3$ is applied to the input y of the device 4 which controls the machines so that they supply a maximum output.

Simultaneously, the flip-flop 25 whose input D is constantly at logic level 1 and whose input H and "clear" respectively receive the signals $\overline{C_3}$ and $\overline{C_2}$, remain at rest. Its output $\overline{Q}$ is hence at level 0 and its output Q supplies a logic signal A at level 1. The signal A is applied at the same time as the signal $C_3$ to the inputs of NOT-AND gate 24 of which the output passes therefore to 0. This output is connected to an input of the OR gate 22 whose other input receives the signal $C_1$, which is zero in this case, and of which the output $C_4$ is hence zero, and which suppresses the inhibition of the buffers, through the control device 14.

During this first phase, the machines operate therefore as generators with a maximum power output and the buffers T1 and T2 delivery respectively currents $IT_1$ and $IT_2$ proportional to $U_n - U_b$. Little by little the current in the self-inductances increases, which causes the current of the buffers to diminish, $U_B$ rising again to 50 V. When $U_B$ reaches 50 V, the output $C_3$ of the hysteresis comparator 16 returns to 0 and the flip-flop 25, having a signal $\overline{C_3}$ of level 1 at its input H, emerges from its resting state so that its output signal A passes to level 0. The passage to 0 of the signal $C_3$ causes the signal $C_4$ to pass to 1 so that the buffers are again inhibited. During this time, the signal $C_2$ remains at logic level 1 for the flip-flop 17 has not received a signal at its "clear" input and hence does not change in state. Thus the control signal y of the machines passes to 0 whilst the signal x remains at 1. This signifies that the machines are still generators, but that the commutators are blocked, whilst the buffers are inhibited.

The current passing in the self-inductances L continues to flow through the diodes $D_1$ and $D_2$, but the current decreases and $U_B$ diminishes again.

During this second phase, the signal A which is zero acts on a commutator 19 to introduce between the supply busbar and the hysteresis comparator 16, a phase advance corrector 18 having a transfer function. $(1+a\tau p)/(1+\tau p)$ (Proportional corrector-derivative). The values of a and $\tau$ are fixed by trials. Good results have been obtained, for example, for a=9 and $\tau=5.10^{-5}$ s.

The introduction of this phase corrector circuit amounts to reducing the hysteresis of the phase correcter assembly 18- hysteresis comparator 16. Thus, the comparator 16 again supplies an output $C_3$ equal to 1 as soon as the voltage $U_B$ has decreased to a predetermined value comprised between 50 V and 49.5 V. The passage from $C_3$ to 1 causes the machine control 4 to pass back to its generator mode of operation with maximum output.

The flip-flops 17 and 25 not being able to return to their resting state before a signal 1 is applied to their "clear" input, that is to say before the application of an RZ signal to the "clear" input of the flip-flop 17, the signals $C_2$ and A remain respectively at 1 and at 0. The signal A being at 0, the buffers are still inhibited.

During a second phase, there are therefore oscillations of $U_B$ which leads to an oscillation of $C_3$, hence of the signal y applying or suppressing the control for maximum output from the machines operating as generators, the buffers being inhibited.

The values of the current flowing in the buffers at the beginning of the first phase are supplied to the processing unit 3 which applies a new order, adapted to the requirements, to the machines. At the moment when this new order is applied, the processing unit sends an RZ pulse to the regulator which restores the comparator 16 to 0 as well as the flip-flops 17 and 25. This terminates the second phase of regulation. Signal A returning to 1, the phase advance corrector 18 is withdrawn from the circuit connecting the supply busbar to the comparator 16. The regulator will hence subsequently be able to react again if the voltage $U_B$ drops below $U_n - 1\% \ U_n$.

It is of course obvious that the embodiment of the regulator shown in FIG. 6 is only one particular embodiment, notably as regards the logic part and that it is possible to utilize any equivalent device enabling inhibition of the dissipator and of the buffers to be actuated, as well as the operation of the machines, in the manner indicated above.

The operation of the system according to the invention will now be explained by means of the block-diagram of FIG. 9.

Thus, as has already been mentioned, the control of the machines enables regulation of the value of the coefficient K of each machine, corresponding to the value of the mean flux.

Figure 9:
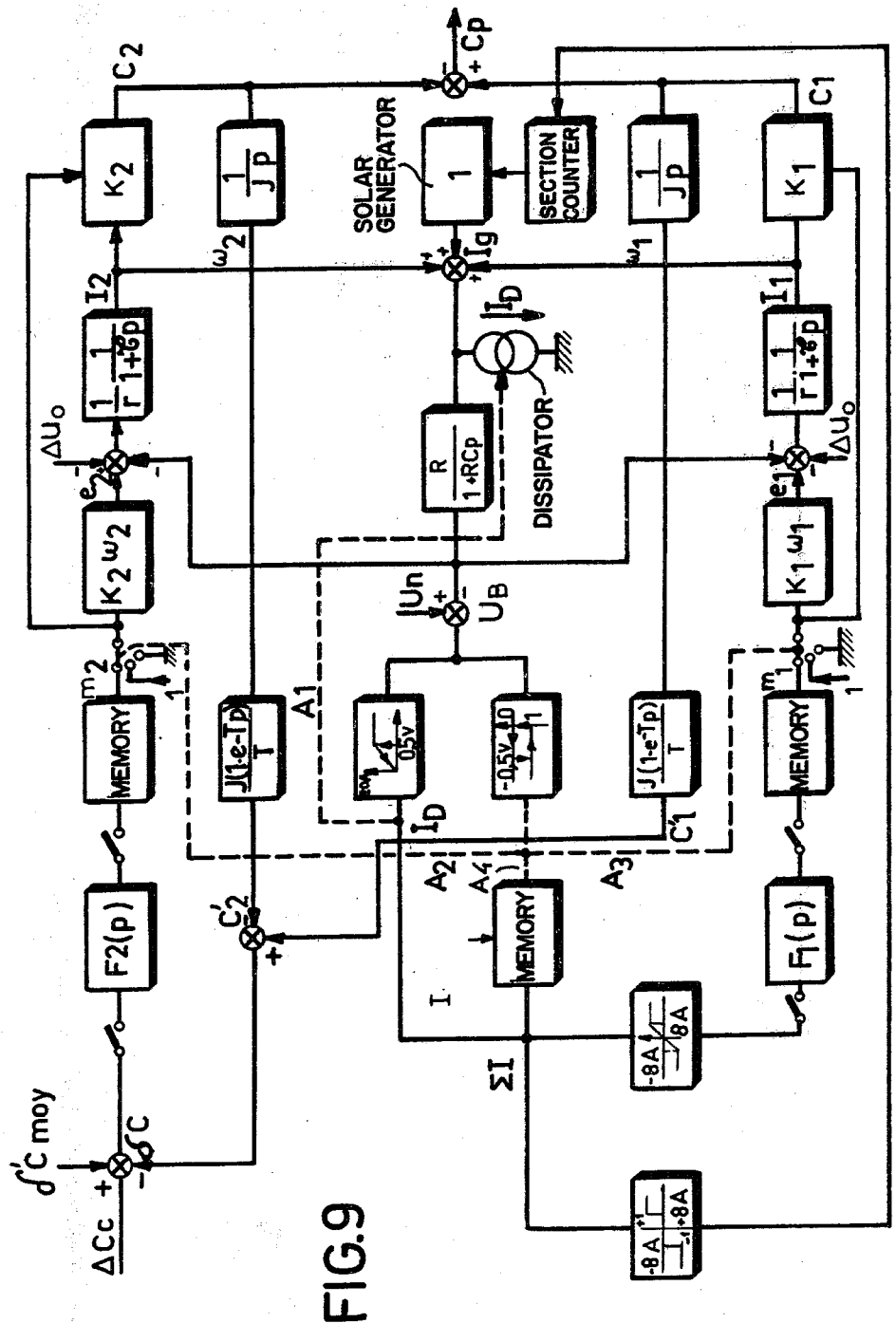
FIG. 9 illustrates in the form of a block diagram the operation of an embodiment of the system according to the invention.

In FIG. 9, the machines M1 and M2 have respectively a coefficient $K_1$ and $K_2$. These machines respectively supply a torque $C_1$ and $C_2$ of which the resultant $C_p = C_1 - C_2$ (the machines being arranged in counter-rotation) is the torque effectively applied to the satellite 8.

According the the invention the control of the machines by the processing unit 3 is effected by two identical feedback loops but receiving different error signals.

The first loop, controlling the machine M1, receives an error signal constituted by the current $\Sigma I$ passing through the voltage regulator 6. The current $\Sigma I$ is only zero when the voltage in the supply busbar remains within a range of $\pm 1\%$ around the rated value.

The second loop, controlling the machine M2, receives an error signal constituted by the deviations of the torque. This error signal is given by the following formula: $\delta C = C'_1 + \Delta Cc + \delta' Cmean - C'_2$ in which $C'_1$ and $C'_2$ are respectively the torques produced by the machines $M_1$ and $M_2$ computed by the processing unit from the measurements of the speeds $\omega_1$ and $\omega_2$ of the machines and taking into account the preceding sample. In FIG. 9, it is indicated that the transfer function, as a Laplace transform, enabling passage from $\omega$ to C' is J $1-e-Tp/T$, the transfer function between the torque C supplied by one machine and the speed $\omega$ of this machine being convertible into the form $1/Jp$, J being the inertia of the rotor of the machine.

$\delta'C$ mean represents the average correction torque resulting from the control of the machines within a given speed range memorized in the processing unit from torque corrections effected during preceding cycles.

Each of the feedback loops includes a transfer function corrector network $F_1(p)$ or $F_2(p)$. At the output of the corrector network an error signal is obtained which supplies the control position. The latter is memorized in a memory of the processing unit 3 and then applied to the corresponding machine.

The control signal gives the value of the coefficient K to the corresponding machine, which determines the e.m.f., $e_1$ or $e_2$ of the machine concerned, is indicated in the FIG. 9 since $e = K\omega$.

To the e.m.f. thus produced the busbar voltage $U_B$ and the voltage drop $\Delta U_o$ in the semi-conductors of the machine control device 4, readjust.

The resulting voltage is then applied to the terminals of the circuit constituted by the filtering self-inductance and the internal resistance of the windings of the machine, whose transfer function is represented by $(1/r) \cdot (1/1+\tau p)$ in FIG. 9, which determines the currents $I_1$ and $I_2$ passing through the windings of the machines.

In FIG. 9 is also shown the solar generator 1 which supplies a current $I_g$ which is added to the currents $I_1$ and $I_2$ passing through the machines. To the resulting current is adjusted the current $I_D$ passing through the dissipator and the current then obtained passes through the load. The transfer function giving the voltage $U_B$ as a function of this load current is shown in FIG. 9 by the transfer function $R/1+1RC$ p of the load.

The voltage regulator operates from the error signal produced by the difference between the busbar voltage $U_B$ and the rated voltage $U_n$.

When the busbar voltage $U_B$ is higher by 1% than the rated voltage, this difference is detected by the regulator and the dissipator D comes into operation. In FIG. 9, the control of the dissipator is indicated by the dashed line A1. The dissipator then supplies a current $I_D$ proportional to the voltage deviation.

On the contrary, when the busbar voltage $U_B$ is less by 1% than the reference voltage, the machines are controlled so as to operate as all-or-nothing generators, the control being shown diagrammatically in FIG. 9 by the dashed lines $A_2$ and $A_3$, whilst the buffers of the regulator are put into operation. The dashed line $A_4$ shows diagrammatically the memorization of the current in the buffers at the beginning of the first phase. The regulator then produces the current I.

The current $\Sigma$ I passing through the regulator serves, as has already been mentioned, to servo-couple the machine $M_1$ when the current does not exceed a given threshold, fixed in FIG. 9 at 8A.

If this threshold is exceeded, the solar generator is directly actuated through a section counter which adds or adjusts sections according to the requirements, that is to say according to the direction of the current $\Sigma$ I.

The processing unit 3 has connections with all the components of the system, as shown in FIG. 1, and its functions are multiple as emerges from the above description. It must in effect:

Ensure the correct operation of the machines by avoiding the operating limits to be reached, already mentioned previously, where it is indicated that these limits are notably the maximum current passing through a machine, the load speed, the minimum speed $\omega m$ ensuring regulation, the maximum $\omega M$ enabling regulation during the eclipse period and the maximum speed $\omega MM$ tolerated by the machine.

Avoid prolonged operation of the regulator 6.

Actuate the control device 2 of the solar generator 1.

Effect the calculation and ensure the correction of the disturbing torques along axes X and Y by controlling the reaction wheels 10.

Effect the calculation of the disturbing torques along the axes Z and ensure the control of the energy storage machines.

The complexity of the processing logic necessitated by all of these operations and the high accuracy required lead to the selection of a very sophisticated processing device.

There are, a priori, two possible solutions. In fact, it is possible to utilize a wired or microprogrammed logic circuit or even a processing unit constituted by a microprocessor.

In the first case there are a very large number of circuits by reason of the complexity of the functions to be effected. This leads to a processing unit having considerable volume and weight. Moreover, such a unit has high consumption, mediocre reliability and leads to difficulties if it is desired to ensure the redundancy of the circuits. This solution is hence expensive and moreover it leads to considerable difficulties of modification and adjustment.

On the other hand, the utilization of the microprocessor permits the number of circuits to be notably reduced. Consequently, the processing unit can have low volume and weight, acceptable consumption and better reliability. In addition, it is possible to introduce a redundancy by parallel chains or by reconfiguration. Moreover, the flexibility of modification of the processing unit by modification of the logics used by the microprocessor greatly facilitates the adjustment of the system. Thus, it appears desirable to use a microprocessor, preferably with a wired logic circuit.

A microprocessor responding fully to the problem set is the SBP 9900 microprocessor marketed by the Texas Instruments Co. This 16-bit microprocessor enables accurate calculations, which is necessary given the low disturbing torques involved. In addition, it can operate in the military range. In this microprocessor the operations of multiplication and of division are wired which permits the reduction in the calculation time. Also, it includes numerous addressing modes which permits easier processing of the calculations and it has low consumption.

The various functions which the microprocessor must fulfill emerge from the preceding description and it is advisable therefore to program it in a way adapted to the practical utilization contemplated.

The programs used for this purpose do not form part of the invention and hence will not be described here.

In conclusion, it appears that the invention enables the obtaining of a relatively flexible integrated system, which supplies a very competitive solution both as regards the problem of energy storage with kinetic energy having much better performance than chemical storage, and as regards the problems of piloting the space vehicle, since the latter is in no way affected by the introduction of kinetic energy storage.

It is self-evident that the present invention has only been described and illustrated by way of preferred example and that it will be possible to introduce equivalents into the constituents without however departing from the scope of said invention as defined in the appended claims.

We claim:

1. Method for the control and storage of energy for a space vehicle, notably for a satellite, having a piloting device, in which a busbar voltage available at a supply busbar is provided by a solar generator, and by a kinetic energy storage device including two momentum wheels in counter-rotation, said wheels serving also to create the torques necessary for piloting the satellite, said method comprising servo-coupling the momentum wheels to the busbar voltage through a first feedback loop including a regulator mounted between the supply busbar and a control device for the momentum wheels, so as to regulate the busbar voltage, servo-coupling the momentum wheels to the speed of the momentum wheels through a second feedback loop comprising a processing unit receiving signals representing said speed and connected to said control device for said wheels, so as to keep at a very low level the disturbing torques produced by the kinetic energy storage device, and servo-coupling the momentum wheels to the piloting device through a third feed-back loop comprising in series the piloting device, the processing unit and the momentum wheel control device, so as to supply the necessary torque for piloting.

2. Method according to claim 1, wherein the three feedback loops have very different time constants so as to ensure their discoupling.

3. Method according to claim 2, wherein the time constant of the first, second and third feedback loops are respectively 20 μs, 0.1 s and 10 s approximately.

4. A control and energy storage device for a space vehicle, notably for a satellite, comprising
 a satellite load,
 a solar generator and a kinetic energy storage device including a supply busbar providing a busbar voltage available at said supply busbar for application to said satellite load,
 said kinetic energy storage device including two momentum wheels mounted in counter-rotation, said wheels serving also to create the necessary torques for the piloting of the satellite and being operable as a motor or as a generator.
 a control device for said momentum wheels connected to control said wheels,
 a first feedback loop including
  a regulator mounted between said supply busbar and said control device for said momentum wheels,
 a second feedback loop including
  a processing unit receiving signals representing the speed of said momentum wheels and connected to said control device for said momentum wheels, and
 a third feedback loop including
  a piloting device which with said processing unit and said momentum wheel control device are connected in series.

5. The device according to claim 4 further characterized by
 reaction wheels connected to said processing unit with said reaction wheels arranged at 90° along axes perpendicular to said energy storage momentum wheels in order to compensate for the deviations in kinetic moments of said energy storage momentum wheels.

6. The device according to claim 5 further characterized by
 a control device for said solar generator also connected to said processing unit.

7. Device according to claim 4, wherein said processing unit receives signals representing the current traversing said regulator so as to modify the control of said momentum wheels or the useful surface of said solar generator.

8. Device according to claim 7, wherein said processing unit includes a micro-processor.

9. Device according to claim 8, wherein said regulator includes a dissipator mounted in parallel with said load and actuated as soon as the busbar voltage drops below a first predetermined value, and two buffers each mounted respectively in parallel with a self-inductance connecting each of said momentum wheels to said supply busbar and actuated when the busbar voltage rises above a second predetermined value.

10. Device according to claim 9, wherein said dissipator and said buffers are controlled current generators.

11. Device according to claim 10, further including a device acting on said control device for said momentum wheels so as to cause them to operate as generators with a maximum delivery rate and then in all or nothing mode when the busbar voltage exceeds the second predetermined value.

12. A device according to claim 11, further characterized by
 a control device for said buffers and said dissipator, and
 said regulator including hyteresis comparators whose input is connected to said supply busbar and whose outputs are connected to said control device for said buffers and said dissipator as well as to said control device for said momentum wheels.

* * * * *